United States Patent [19]

Caspers et al.

[11] 4,081,672
[45] Mar. 28, 1978

[54] LOW-LOSS SIGNAL COUPLER FOR OPTICAL COMMUNICATIONS AND INTEGRATED OPTICS

[75] Inventors: Hubert H. Caspers, La Mesa; Howard E. Rast, Jr., Sulana Beach, both of Calif.

[73] Assignee: The United States of America as represented by the Secretary of the Navy, Washington, D.C.

[21] Appl. No.: 729,052

[22] Filed: Oct. 4, 1976

[51] Int. Cl.² .............................................. G02B 5/16
[52] U.S. Cl. ................................. 250/227; 350/96.16
[58] Field of Search ............... 350/96 WG, 96 C; 250/227, 368, 458, 459; 240/1 LP, 2.25

[56] References Cited

U.S. PATENT DOCUMENTS

| | | | |
|---|---|---|---|
| 2,358,867 | 9/1944 | Madan | 240/2.25 |
| 2,695,964 | 11/1954 | Schepker | 250/368 |
| 2,798,147 | 7/1957 | Orsatti | 240/2.25 |
| 3,135,866 | 6/1964 | McNaney | 250/213 A |
| 3,526,880 | 9/1970 | Filippazzi | 350/96 C |

*Primary Examiner*—David C. Nelms
*Attorney, Agent, or Firm*—R. S. Sciascia; G. J. Rubens; T. M. Phillips

[57] ABSTRACT

A method and means for coupling information or signal power into or out of fiber optics for integrated optical waveguides. The coupling consists of selectively doping with impurity ions such as rare earth or transition metal ions which are excited to fluorescence within the waveguide by the frequency of the transmitted carrier wave. The fluorescent emission is then detected at right angles to the fiber using conventional photodetectors and amplifiers.

9 Claims, 2 Drawing Figures

LOW-LOSS SIGNAL COUPLER FOR OPTICAL COMMUNICATIONS AND INTEGRATED OPTICS

Background of the Invention

Conventional means for sampling an optical communications transmission or data link involve the use of partially metalized dielectric materials (half-silvered mirrors) or the ordinary specular reflectance of material such as glasses, dielectrics, or insulators; grading couplers, prisms, etc. Considering a glass flat inclined at 45° to a collimated beam of light, part of the light is transmitted while the remainder is absorbed and reflected. It is a well-known fact in the science of optics that the glass flat, if transparent to this particular frequency of light will transmit a fraction of the power while reflecting a certain fraction at the boundaries of air and glass. Although a very small fraction will be absorbed, this is not considered significant. Whenever the beam encounters an interface between air and glass, reflection takes place and, the beam is displaced by a small distance, $$d = \frac{\sqrt{2}}{2} t \left(1 - \frac{1}{\sqrt{2n^2 - 1}}\right)$$

where $t$ is the thickness of the slab and $n$ is the refractive index at the wavelength of the light beam.

In case the beam is plane polarized, the reflected beam at the first interface will in general change its direction of polarization upon reflection. In the special case where the beam is polarized with its Electric Vector Parallel to the Plane of incidence, the fraction of the light reflected will be a pure function of the refractive index of the slab material and the polarization will remain unchanged. This fraction $r$, is given by $$r = \tan^2(\phi - \phi')/\tan^2(\phi + \phi')$$

where
$\phi = 45°$ and
$\phi = \sin^{-1}[\sqrt{2}/2n]$.

By way of example, take $n = 1.50$, then
$\phi = 28° 7'$ and
$r = 8.47 \times 10^{-3}$ that is, about 1% of the light intensity is reflected. The main disadvantages of this means of signal out-coupling are that there is a 1.2% signal loss which is unacceptable in fiber optics transmissions and the beam displacement makes it impractical for coupling.

Summary of the Invention

The present invention provides for a fiber optics coupler which overcomes the disadvantages of prior known couplers. A fabricated optical fiber is provided with a means of absorbing a fraction of the signal transmitted down the axis of the fiber and re-emitted in all directions. The means for absorbing and re-emitting a small fraction of the signal power may be a portion of the fiber selectively doped. The fiber may be terminated into a cylindrical receptical containing a fluorescent solution. The fluorescent solution would be an organic dye, for example, such as sodium fluoresin dissolved in a solvent whose refractive index is adjusted to match that of the transmission fiber. The coupler may also be a solid state substitute for dyes, such as a didymium glass or rare earth or transition metal-doped glass or crystal having the appropriate refractive index.

Objects of the Invention

An object of the invention is for the provisions of a low-loss signal coupler for optical communications and integrated optics.

Another object of the invention is the provision of a low-loss signal coupler for optical communications wherein the coupler is frequency selective.

Other objects and many of the attendant advantages of this invention will be readily appreciated as the same becomes better understood by reference to the following detailed description when considered in connection with the accompanying drawings.

Description of the Preferred Embodiment

Figure 1:
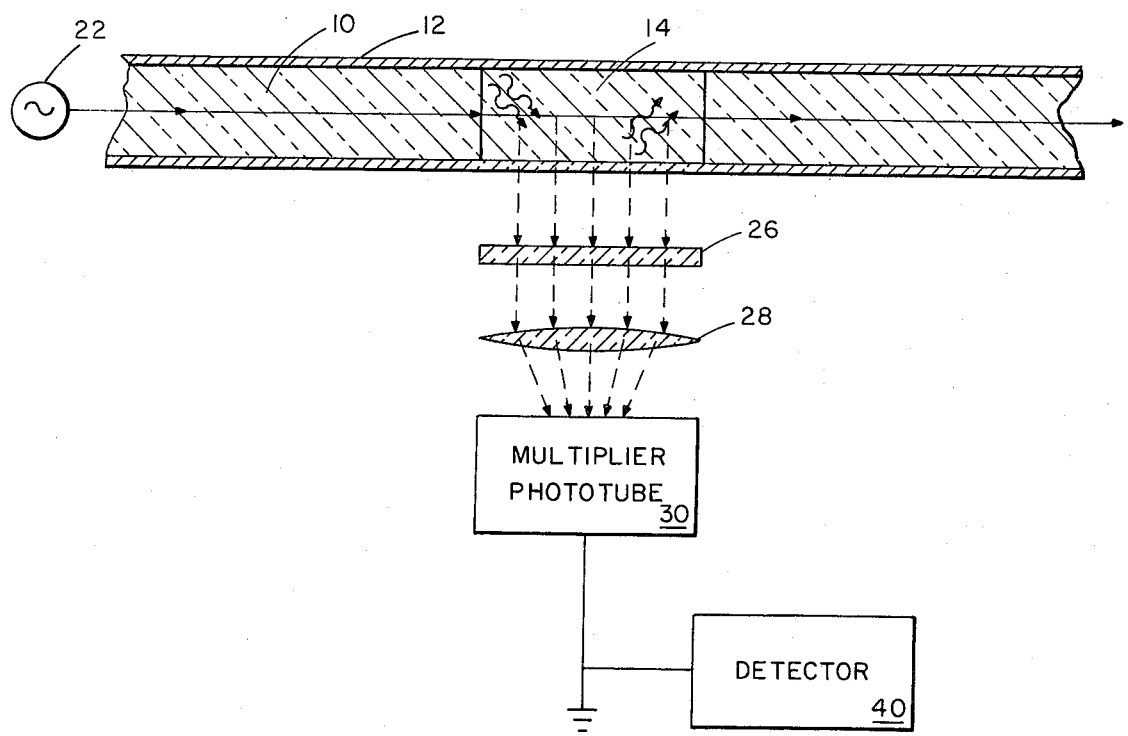
FIG. 1 is a diagrammatic showing of a preferred embodiment of the invention.

Referring now to the drawing wherein there is shown a fiber optics transmission line 10 of refractive index $n_1$, cladded by an appropriate cladding material 12 of index $n_2$. A section of the transmission line 10 includes fluorescent material which will absorb a small fraction of a signal transmitted along the transmission line and re-radiate at a frequency depending upon the particular fluorescent material included in the section 14. The phosphorescent section of the transmission line may consist of a fabricated optical fiber. The fabricated optical fiber can be formed by diffision of impurity centers into the fibers such as by way of example, $NdCl_3$ or $Cr^{3+}$; introduction of impurity centers into fiber melt; ion implantation of fibers; and insertion of fluorescent dye solution. It is preferable that this operation takes place before the outside cladding is applied to the fiber core. It is important that the resulting concentration of doping is sufficiently low in order to reduce the fluorescent quenching effects and also so as not to alter the refractive index of the fiber core.

When the coupling portion of the transmission line takes the form of a cylindrical receptical containing a fluorescent organic dye, for example, such as sodium fluorescein dissolved in a solvent, the refractive index of the solvent should be adjusted to match that of the transmission fiber 10. The cylindrical receptical 20 (FIG. 2) would be joined to the fiber optics by fusion or other well known techniques of glass manufacture fabrication.

The operation of the device may be understood by referring to FIG. 1. An optical signal source 22 is transmitted down the axis of the fiber 10. It enters the region 14 containing fluorescent material at low concentration. Depending on the concentration and quantum yield of the fluorescent material, a small fraction of the signal power is absorbed by the medium and re-emitted in all directions. The re-emitted radiation is filtered and detected. The re-emitted radiation may be passed through a filter 26 and lens 28 to a multiplier phototube 30, the output of which is detected by detector 40.

Figure 2:
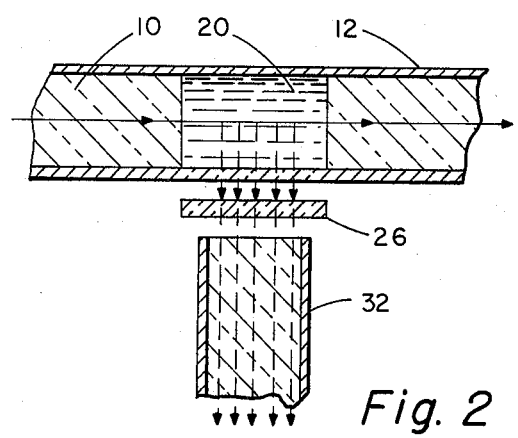
FIG. 2 is a modification of the embodiment of FIG. 1.

In the modification of FIG. 2, the filter 26 may be positioned adjacent the aperture in the re-emitting portion 20 of the fiber optic 10. Another fiber optic 32 is positioned adjacent filter 26 for picking up and transmitting the re-emitted radiation. If desired filter 26 could be a sleeve surrounding the re-emitting portion 20. It is to be understood that the emitted light is transmitted through the cladding. The cladding should then be transparent to the fluorescence.

The signal from the coupler may be sampled without a significant attenuation of the signal power. Use of the sodium fluorescein dye has the advantage that fluorescence may be detected in solution concentrations as small as $10^{-7}$ mole concentrations where at about 5200A the extinction coefficient is roughly $0.01 cm^{-1}$. If the cell depth is 1mm then the amount of light transmitted through the cell is 99.9%, but because the quantum yield of fluorescence is near unity all absorbed photons will be re-emitted as fluorescence. The fluorescence emission will be at longer wavelengths than the transmitted signal thereby simplifying filtering and detection. The fluorescence life times or decay constants are on the order of nanoseconds, thereby not contributing to the degradation of signal bandwidth, approximately 100MHz. Method of fabrication is simple and inexpensive. By placing these couplers at regular intervals along a long transmission line, a convenient method of troubleshooting or signal tracing is created.

Obviously many modifications and variations of the present invention are possible in the light of the above teachings. It is therefore to be understood that within the scope of the appended claims the invention may be practiced otherwise than as specifically described.

What is claimed is:

1. A low-loss fiber optics coupler comprising:
   a. a length of fabricated optical fiber adapted to transmit optical signals;
   b. means positioned within said fiber for absorbing and fluorising a fraction of the signal being transmitted;
   c. means positioned adjacent said absorbing and fluorescing means for detecting the re-emitted signal.

2. The coupler of claim 1 wherein said absorbing and fluorescing means is a fluorescent compound.

3. The coupler of claim 2 wherein said absorbing and fluorescing means is a fluorescent liquid.

4. The coupler of claim 2 wherein said absorbing and fluorescing means is an impurity doped optical fiber.

5. The coupler of claim 2 wherein said absorbing and fluorescing means is ions implanted in a section of said optical fiber.

6. A multiplexing system comprising:
   a. a plurality of optical signal sources supplying a plurality of optical signals at different frequencies;
   b. a fiber optic communication link for transmitting said optical signals;
   c. a plurality of fluorescent couplers positioned at various distances in said fiber optic link from said signal sources to form detecting stations, each of said couplers including a different fluorescent material for selectively re-emitting only one of said transmitted optical signals.

7. The method of coupling optical signals out of fiber optic with a minimum of signal loss, the steps of:
   a. doping a portion of the fiber with impurity ions which can be excited to fluorescence by the optical signal;
   b. positioning signal detecting means adjacent to said doped portion for detecting the light emitted by the ions.

8. The method of coupling optical signals out of fiber optic with a minimum of signal loss, the steps of:
   a. forming a cell containing a fluorescent dye;
   b. positioning said cell in line with the fiber so that the optical signal will excite the dye to fluorescence;
   c. positioning signal detecting means for detecting the fluorescing of said cell.

9. The method of claim 8 wherein said fluorescence dye is sodium fluorescein.

* * * * *